(12) United States Patent
Van Wart et al.

(10) Patent No.: US 7,788,294 B2
(45) Date of Patent: Aug. 31, 2010

(54) METHOD AND SYSTEM FOR COLLECTING AND ANALYZING ENVIRONMENTAL DATA

(75) Inventors: William F. Van Wart, Brooklyn, NY (US); Paul J. Denning, Tuamgraney (IE); Richard T. Stonier, Norwalk, CT (US)

(73) Assignee: Graywolf Sensing Solutions, LLC, Cambridge, CT (US)

( * ) Notice: Subject to any disclaimer, the term of this patent is extended or adjusted under 35 U.S.C. 154(b) by 358 days.

(21) Appl. No.: 11/893,890

(22) Filed: Aug. 17, 2007

(65) Prior Publication Data

US 2009/0049005 A1 Feb. 19, 2009

(51) Int. Cl.
*G06F 7/00* (2006.01)
(52) U.S. Cl. .................. 707/804; 707/805; 707/802; 705/26; 705/37; 705/45
(58) Field of Classification Search .......... 707/1, 707/10, 100–102, 104.1, 804, 805, 802; 705/1, 705/2, 9, 10, 26, 37, 45
See application file for complete search history.

(56) References Cited

U.S. PATENT DOCUMENTS

| | | | | |
|---|---|---|---|---|
| 7,317,927 | B2 * | 1/2008 | Staton et al. | 455/456.4 |
| 7,425,307 | B2 * | 9/2008 | Sohl et al. | 422/67 |
| 7,530,113 | B2 * | 5/2009 | Braun | 709/224 |
| 2002/0055857 | A1 * | 5/2002 | Mault | 705/2 |
| 2002/0128883 | A1 * | 9/2002 | Harris | 705/4 |
| 2002/0144537 | A1 * | 10/2002 | Sharp et al. | 73/31.01 |
| 2003/0120593 | A1 * | 6/2003 | Bansal et al. | 705/39 |
| 2003/0208378 | A1 * | 11/2003 | Thangaraj et al. | 705/2 |
| 2003/0208397 | A1 * | 11/2003 | VanDusen | 705/14 |
| 2003/0217054 | A1 * | 11/2003 | Bachman et al. | 707/4 |
| 2004/0225452 | A1 * | 11/2004 | Campbell et al. | 702/22 |
| 2004/0249654 | A1 * | 12/2004 | Sohl et al. | 705/1 |
| 2005/0027733 | A1 * | 2/2005 | Donahue | 707/102 |
| 2005/0203962 | A1 * | 9/2005 | Zhou et al. | 707/200 |
| 2006/0026166 | A1 * | 2/2006 | Sattler et al. | 707/10 |
| 2006/0031209 | A1 * | 2/2006 | Ahlberg et al. | 707/3 |
| 2006/0089870 | A1 * | 4/2006 | Myhr | 705/14 |
| 2006/0099969 | A1 * | 5/2006 | Staton et al. | 455/456.4 |
| 2006/0099971 | A1 * | 5/2006 | Staton et al. | 455/456.6 |
| 2006/0143041 | A1 * | 6/2006 | Tipirneni | 705/2 |
| 2006/0173580 | A1 * | 8/2006 | Desrochers et al. | 700/276 |
| 2007/0011334 | A1 * | 1/2007 | Higgins et al. | 709/227 |

(Continued)

OTHER PUBLICATIONS

National Technology Alliance—Opportunities to accelerate Temporal Geospatial Capability—MS DN—Jul. 30, 2004 (pp. 1-73).*
Thomas Getz Ombudsman—"Records Management Policy"—Jun. 9, 2003 (pp. 1-70).*

*Primary Examiner*—Jean B. Fleurantin
*Assistant Examiner*—Anh Ly
(74) *Attorney, Agent, or Firm*—Anthony H. Handal; Handal & Morofsky, LLC

(57) ABSTRACT

A method and system for customizing a data logging and analysis program. The method includes connecting environmental sensors to a computer or other data collecting device and accessing a workflow customization interface that allows a user to select a customized workflow or optionally to customize a data collection program by selecting at least one action. The method also includes accessing a user interface to run a customized program.

14 Claims, 12 Drawing Sheets

U.S. PATENT DOCUMENTS

| | | |
|---|---|---|
| 2007/0044539 A1* | 3/2007 | Sabol et al. ................ 73/19.01 |
| 2007/0067373 A1* | 3/2007 | Higgins et al. .............. 707/206 |
| 2007/0073908 A1* | 3/2007 | Gormley ........................ 710/8 |
| 2007/0106633 A1* | 5/2007 | Reiner ........................... 707/1 |
| 2007/0118410 A1* | 5/2007 | Nadai ............................ 705/4 |
| 2007/0156648 A1* | 7/2007 | Bridges et al. ................ 707/3 |
| 2007/0208592 A1* | 9/2007 | Glenn et al. ................... 705/1 |
| 2007/0222585 A1* | 9/2007 | Sabol et al. ............. 340/539.11 |
| 2007/0266368 A1* | 11/2007 | Szpak et al. ................. 717/105 |
| 2007/0275690 A1* | 11/2007 | Hunter et al. ............. 455/404.2 |
| 2008/0065705 A1* | 3/2008 | Miller ........................ 707/204 |
| 2008/0147465 A1* | 6/2008 | Raines et al. ................... 705/7 |
| 2008/0183575 A1* | 7/2008 | Kaplan et al. ................. 705/14 |
| 2009/0048908 A1* | 2/2009 | Kaplan et al. ................. 705/10 |

\* cited by examiner

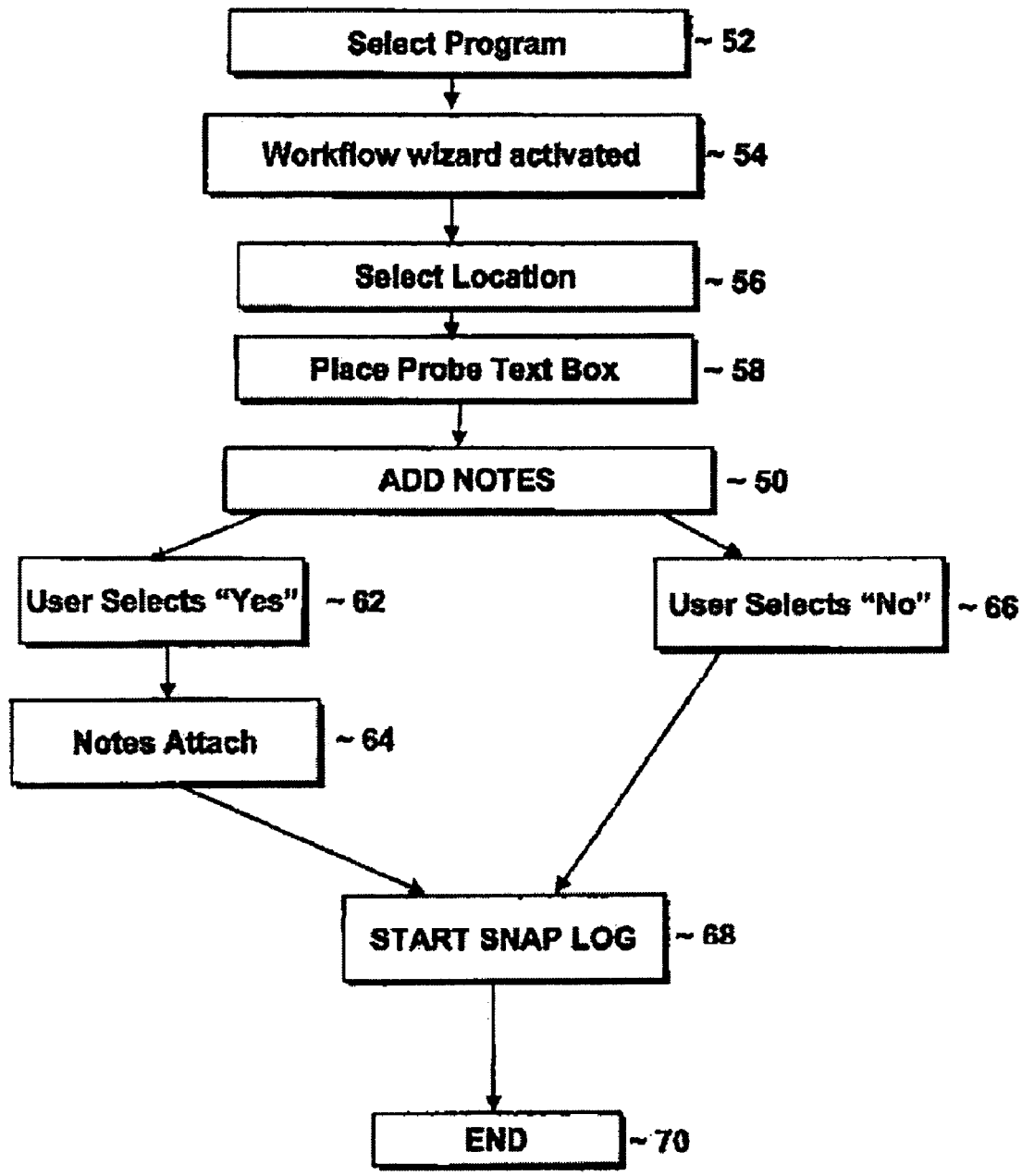

METHOD AND SYSTEM FOR COLLECTING AND ANALYZING ENVIRONMENTAL DATA

TECHNICAL FIELD

The present invention relates generally to the field of data logging, and more particularly to an environmental data logging and analysis system that allows users to select from an included list of environmental data logging and analysis user interface programs and optionally to customize, or to have provider customize for a user, specific environmental data logging and analysis user interface programs.

BACKGROUND

GrayWolf's environmental quality monitoring instruments are used around the world in a broad range of applications including indoor air quality, industrial hygiene, heating ventilation and air conditioning, clean room, research and development, and other environmental measurement applications. Advanced sensors and software technology have been developed to provide instrumentation for environmental quality monitoring. Typically, these sensors are attached an embedded Windows™ CE display unit or a mobile computer, but may include other display and/or data-logging units. This software technology includes many capabilities and provides for digital environmental instrumentation to log and analyze data.

Environmental instrumentation today provides for measurement of a variety of different parameters. The parameters that are measured may include volatile organic compounds, toxic gas, air velocity, carbon dioxide, air velocity, particulates, percent relative humidity, differential pressure, ozone, ammonia and other parameters. Instrumentation and software logs data on these parameters for data analysis and documentation.

SUMMARY OF THE INVENTION

When a user is monitoring these parameters, a user may wish to take different types of readings at different times or over different time periods the inventive system provides environmental quality monitors which also offer the user the ability to add text notes, to add audio notes, to add bit-map drawings or notes in other formats, to reference on-board instructions and/or other options. Other environmental quality instruments offer some of this capability, although the inventive system offers all of the preceding features in a single instrument. The user may also want to analyze data as it is generated. Accordingly, software has been developed in accordance with the invention to address data logging and analyzing. This software allows a user to take measurements and log data on an embedded Windows™ CE display unit or mobile computer or other display and/or data-logging device that is connected to a sensor specific to the user's environmental data logging needs.

However, when a user wishes to collect and analyze data they currently have little control over how a particular program runs, aside from data collection intervals and/or file names. A default program will run which does not give the user flexibility to run the data logging and analysis software as the user feels is appropriate based upon location and desired parameters. The user does not have the ability to select customized data collection programs or to customize and edit the data logging and analysis programs. There is no option for a user to select or optionally create their own data logging and analysis protocol based on the nature of the logged data personal preference or specialized circumstances.

In accordance with the present invention, a customized data logging and analysis program is provided. Users connect a computer, and embedded computing device such as an embedded Windows™ CE display unit, or other display and/or data-logging unit to a data collecting means such as an environmental sensor that senses a variety of environmental parameters. Users access a workflow selection interface that allows users to select a customized user interface data collection program which best suits their application. Optionally, users access a workflow customization interface that allows a user to create or modify a data collection program by selecting at least one action, or they contract GrayWolf to customize the user interface program for their specific use. In one embodiment, the user accesses the selection and customization interfaces by using a mobile computer, such as a PDA so called Windows Mobile Pocket PC™, an embedded Windows™ CE device or other similar device. Such devices are provided with a touch screen, wireless, virtual or other keyboard, and a computing capability designed to run, for example Windows Mobile™ and programs which run on that platform, such as mobile versions of Word™, Excel™, Powerpoint™ and Outlook™. Another aspect of the inventive method is accessing the custom user interfaces via a Windows XP™, Windows Vista™ or similar computer. Another aspect of the inventive method is accessing the custom user interfaces via alternate display and/or data logging devices.

In another embodiment, the user may select from actions including, but not limited to, text instructions displayed on screen for the operator, interactive prompts which decide between subsequent actions, an interface to select a data location, an interface to start a timed or single, current shot "snap-shot" log, an interface to create or edit notes to be associated with a data file, a screen displaying statistical information about collected data and a fall-through or no-operation used in conjunction with prompts.

Additionally, in another embodiment the inventive method includes editing a default program including at least one action.

The inventive system provides for customizing a data logging and analysis program/user interface/workflow. The system includes an interface allowing the selection of a customized program. Optionally, the system includes an interface allowing entry of a plurality of actions in an order determined by a user and an editing means allowing the user to change the order of said plurality of actions. The system also provides a display where the user views and analyzes data. The system also allows the user to have the user interface customized by GrayWolf.

In another embodiment, the method according to the present disclosure includes programming a portable device with a program which presents a series of instructional screens to a user, at least some of the screens being adapted for receiving user input information and outputting guidance information in the form of user prompts to users. Also, at least one of the screens is adapted to receive an input from the user to cause the storage of environmental data. The method also includes connecting an environmental measurement device to the portable device and cycling through the program in response to the user prompts and storing environmental measurement information output by the environmental measurement device. The method can be used in any space and in particular a building such as a hospital or retail space.

In another embodiment, the series of screens include at least one screen that allows the attachment of notes, in-situ, to environmental measurement information.

In yet another embodiment, the series of screens may be selected for a plurality of location specific screens associated with a particular space.

BRIEF DESCRIPTION OF THE DRAWINGS

The operation of the invention will become apparent from the following description taken in conjunction with the drawings, in which:

FIG. 12 is a flow chart illustrating an example program that may be employed according to the inventive method of the present invention.

DETAILED DESCRIPTION OF THE PREFERRED EMBODIMENTS

Figure 1:
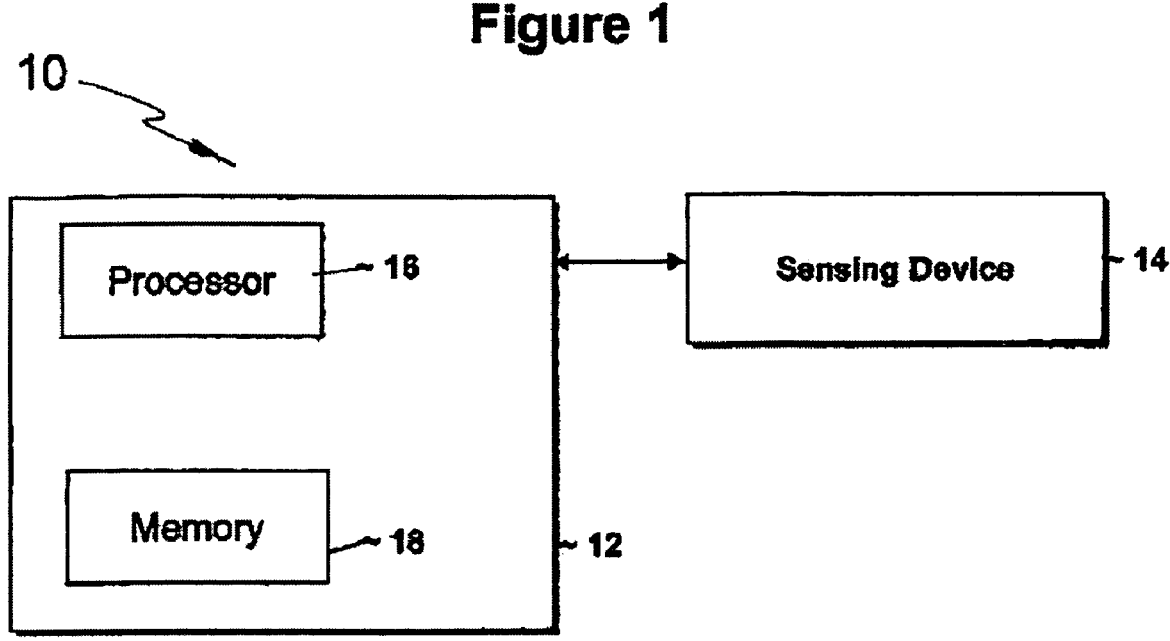
FIG. 1 is a block diagram illustrating a conventional or general-purpose computer and sensor system that may be used for implementing the present invention.

In accordance with the present invention, it is contemplated that the methodologies and system described are implemented on a general purpose computing device. In the illustrated embodiment of FIG. 1, an exemplary system 10 implemented in a computer and complied to sensor system according to the present invention is depicted. A computer 12 is used and is generally a mobile computer (PDA) connected to a sensing device 14 that is equipped to measure environmental and air conditions. It is contemplated, however, that any type of computer may be used in accordance with the present invention including, but not limited to, Tablet personal computers, laptops, and/or desktops. While it is contemplated that a user will utilize a PDA or small laptop personal computer to run a customized program to measure environmental parameters, log environmental data and document environmental conditions and air quality, the inventive system and method is applicable to other computer systems and devices used for monitoring and logging data.

The computer 12 includes a processor 16 for executing machine-readable programming code, command or processing instruction as described herein. The memory 16 may be any known device for storing programming code, commands or processing instruction that are executable by the processor 14. The computer 12 is connected to the sensing device 14. The sensing device may be configured to sense a variety of different environmental parameters to be logged and analyzed. The sensing device 14, with the ability to measure one or more environmental parameters, is connected, for example, to the computer, laptop, or handheld PC 12 by a probe connector such as, for example, a RS232 connector. Alternatively, wireless technology may be employed to enable a wireless connection between the computer 12 and the sensing device 14. This wireless connection, for example, may implement a RS 232 connector over BlueTooth technology. A user may install programs directly from a removable memory card to the computer 12 or the computer 12 may be synchronized with a personal computer. It is contemplated that the computer 12 is a Windows based computer for use with the WolfSense™ program available through GrayWolf Sensing Solutions™.

Figure 2:
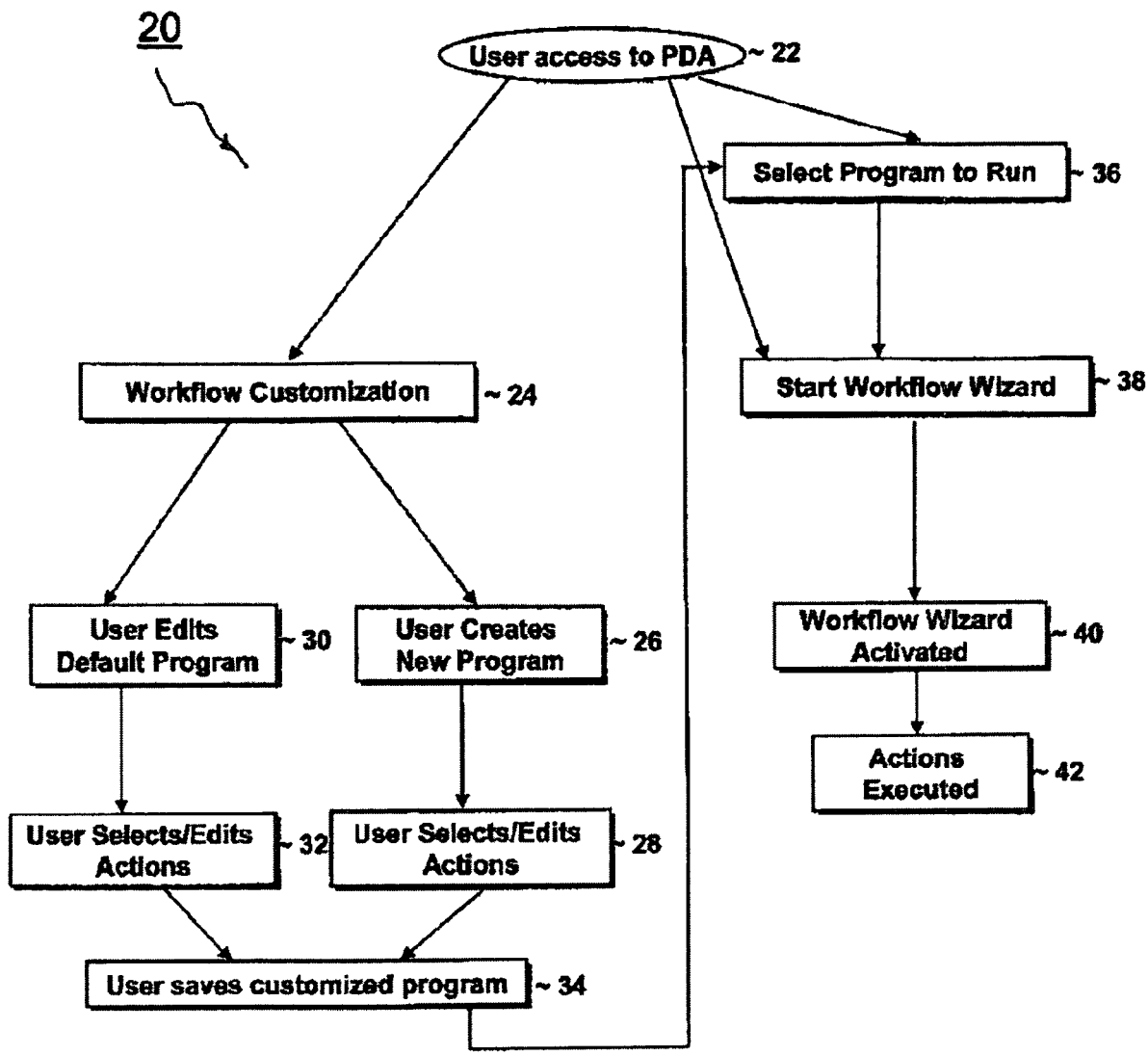
FIG. 2 is a flow chart illustrating an exemplary embodiment of the method as implemented according to the present invention.
Figure 3:
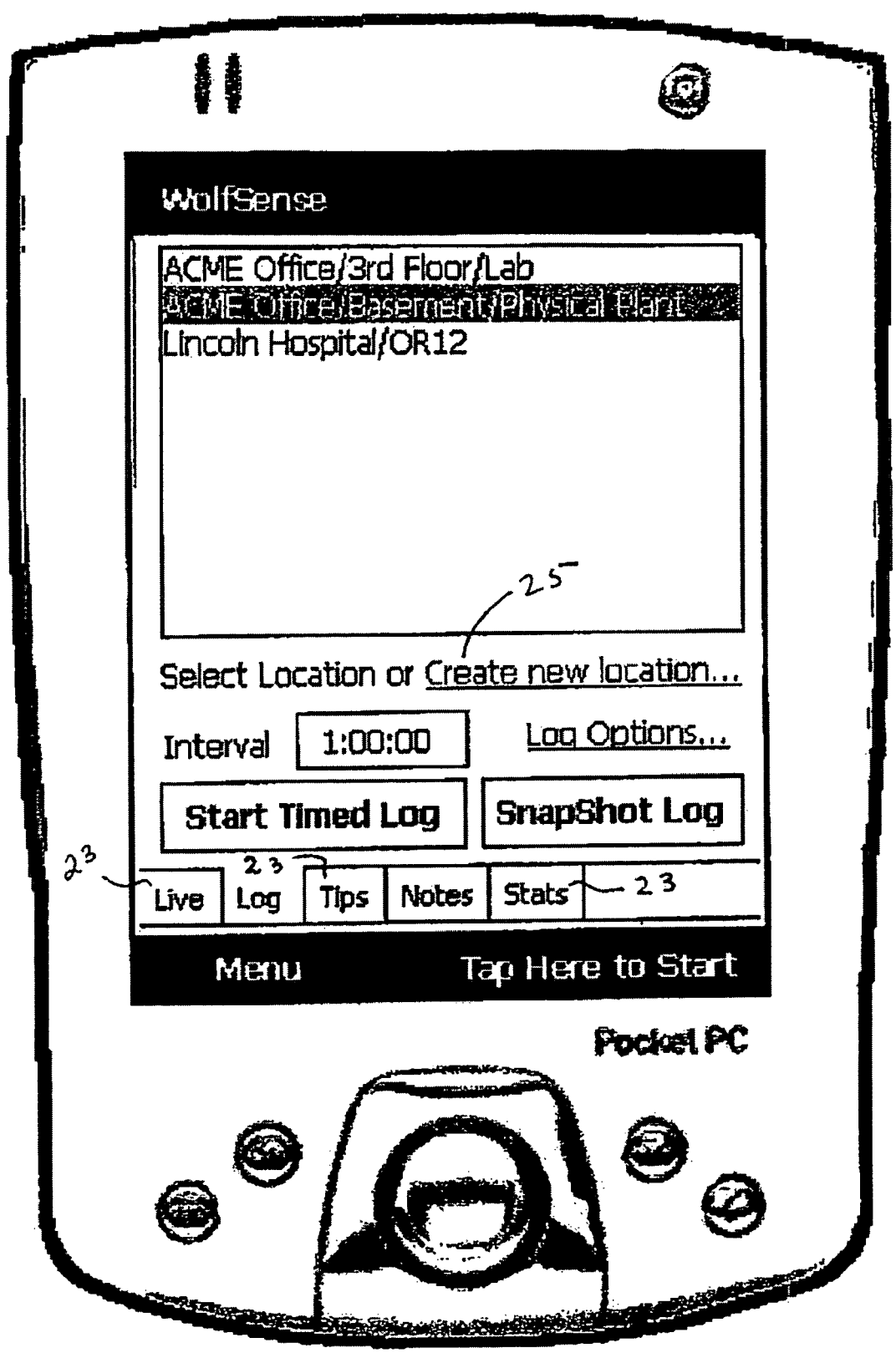
FIG. 3 illustrates an example of a screen shot showing the various tabs in accordance with an embodiment of the present invention.

Referring to FIG. 2 in conjunction with particular references to FIGS. 3-9, the methodology 20 employed by a user desiring to control and operate the air quality logging and analysis program in accordance with the present invention is illustrated. When the user wishes to customize and/or operate the air quality data logging and analysis software, the user accesses a PDA as shown in step 22. A screen appears with various tabs that, when clicked on with a stylus or fingertip, take the user to a correlating screen. A sample of a screen showing the various tabs 23 is shown in FIG. 3. The tabs that appear include, but are not limited to, live, log, notes, tips, stats, and docs. The live tab allows a user to see the current environmental data.

Figure 4:
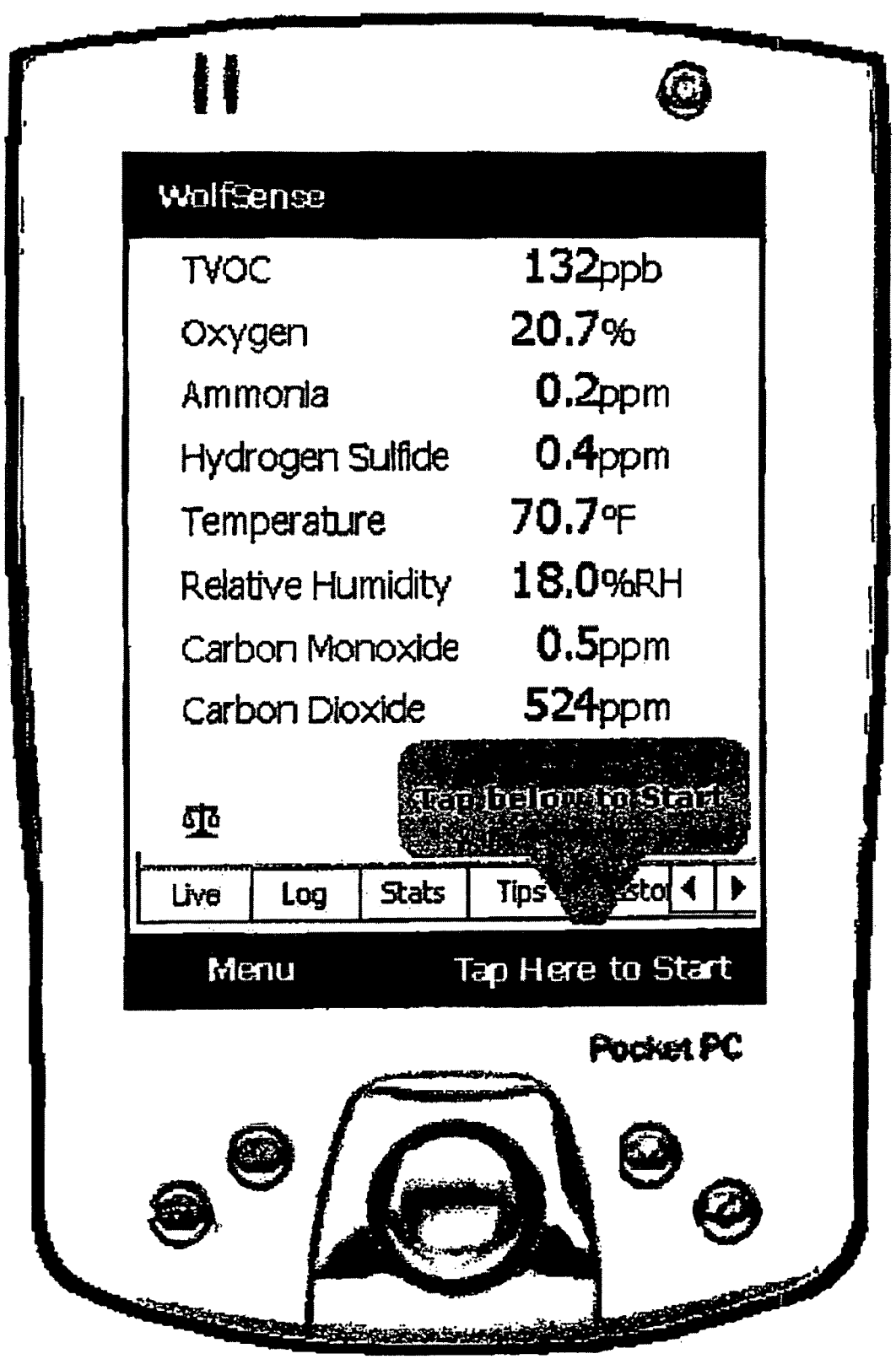
FIG. 4 illustrates an example of a screen shot showing the data being collected when the live tab is selected in accordance with an embodiment of the present invention.

An example of a screen corresponding to the live tab is shown in FIG. 4. Data displayed on the screen is, in accordance with an exemplary embodiment, refreshed once or twice a second.

With the log tab screen shown in FIG. 3, which is selected by default, a user takes periodic readings. For example, a user may take readings every 15 minutes for a week. With the log tab, a user may select a saved location or create a new location with a create a new location link 23 to store the logged data. The log tab screen of FIG. 3 is used to log data for the selected location in a file.

The notes tab screen automatically attaches notes to the file, i.e. file being filled with data.

The tips tab screen gives information on such as government and industry guideline information and basic tips about a certain parameters as well as any other information which the operator of the WolfSense™ system wishes to present to the employees.

The stats tab screen gives high, low or average statistics over a period of time, e.g. one week. Presentation of other statistics may also be provided. The docs tab screen shows documents that the user has pre-loaded on the computer such as standards, guides, instructions, procedures and so forth.

Figure 5:
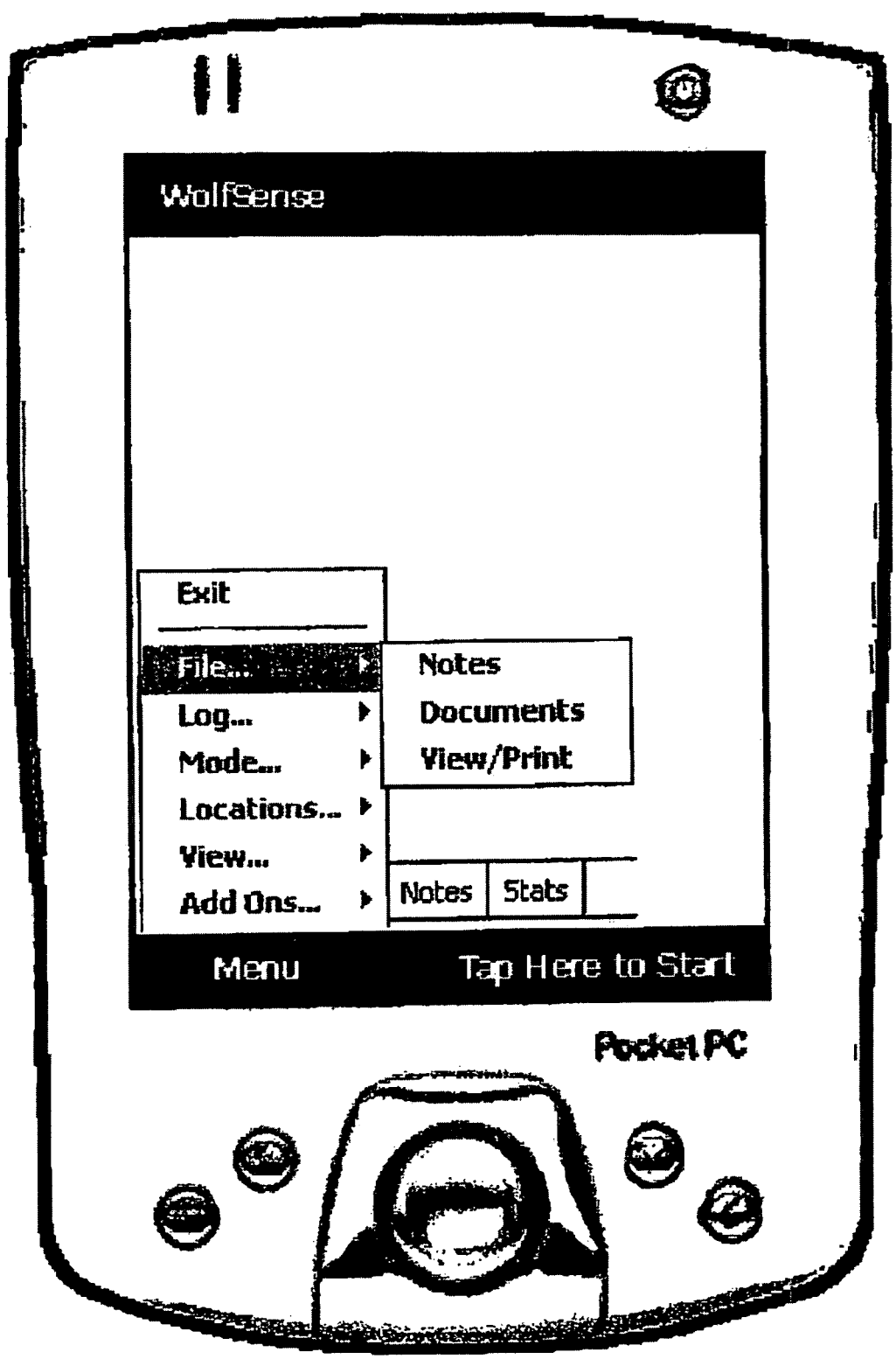
FIG. 5 illustrates an example of a screen shot showing the menu button being selected.

As part of the customization, the program contains information about which tabs are visible to the employee-user, to customize which tabs the user sees. The user selects from a variety of screens from a cascading menu by clicking on a menu button. An example of a screen showing the menu button is shown in FIG. 5. By tapping the menu button, a user may select from options including exit, to exit a program; file, to select a saved document; view or print a document; add notes to a document; and log data.

A workflow program includes one or more actions in any order. These actions include, but are not limited to, TEXT, PROMPT, START TIMED LOG, START SNAP LOG, SELECT LOCATION, ADD NOTE, NO-OP, and STATS.

The TEXT action gives a text instruction box with an OK button. The TEXT action will give instructions or displays a message regarding a certain parameter or sensing location. For example, text box would appear giving the user the instructions "Please place the probe in the center of the room using a tripod mount. Make sure the slots for the sensing elements are approximately 4 feet off the ground." The employee-user would press OK to continue to the next step.

The PROMPT action asks a yes/no question, each branch may have one action, then the program continues to the next action. For example, a dialog box would appear prompting the employee-user with the question: "Would you like to add notes (text, audio, drawing) to the logged data? Select YES to add a note or press NO to proceed to data logging." In this example, pressing YES will activate the NOTE action and the user may add notes through the notes interface. Pressing NO, will bypass note collection and continue onto the next action.

The START TIMED LOG action prompts the user to start a timed log sequence. The start timed log action is accessed through the START TIMED LOG interface. The user determines the period of time for this sequence. This period of time may be for as long or as short as the user chooses. Once a started timed log sequence begins, the reading will show up on the screen. For example, the user is shown the START TIMED LOG interface where they can select a log interval ranging from 1 second to 24 hours. The user selects START and the datalogger begins storing data, one data row per selected interval.

The START SNAP LOG action prompts a user to take a snapshot log reading. A snapshot log reading is a reading at one specific point in time. This is useful, for example, if a user is documenting a walk-through survey of a particular location. The START SNAP LOG will be time and date stamped, so the exact time and date are known and can be accessed by clicking on top to start in FIG. 5 which brings up a snapshot log screen as is shown in FIG. 6.

Figure 6:
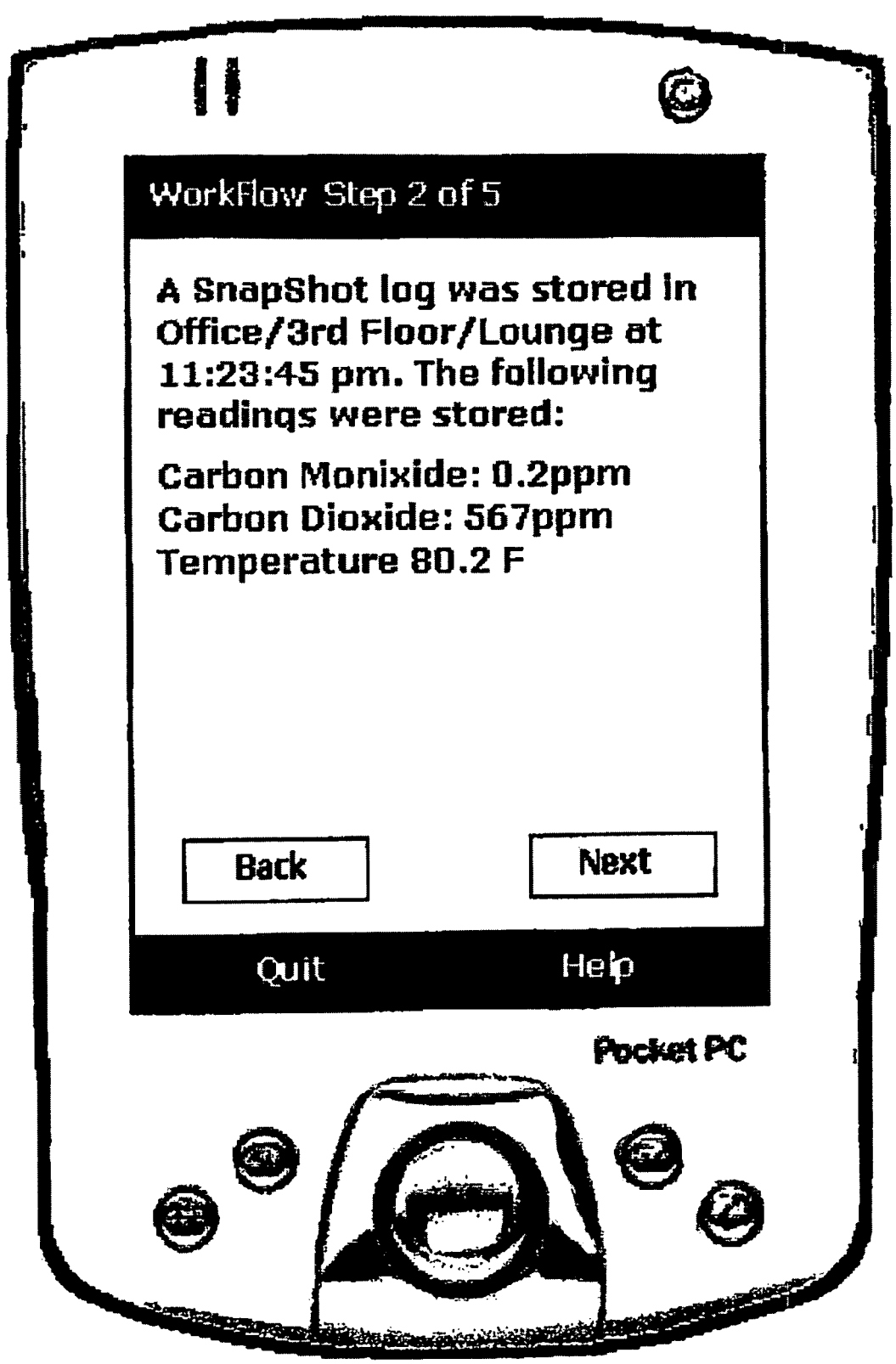
FIG. 6 illustrates an example is a screen shot showing a snap shot log.
Figure 7:
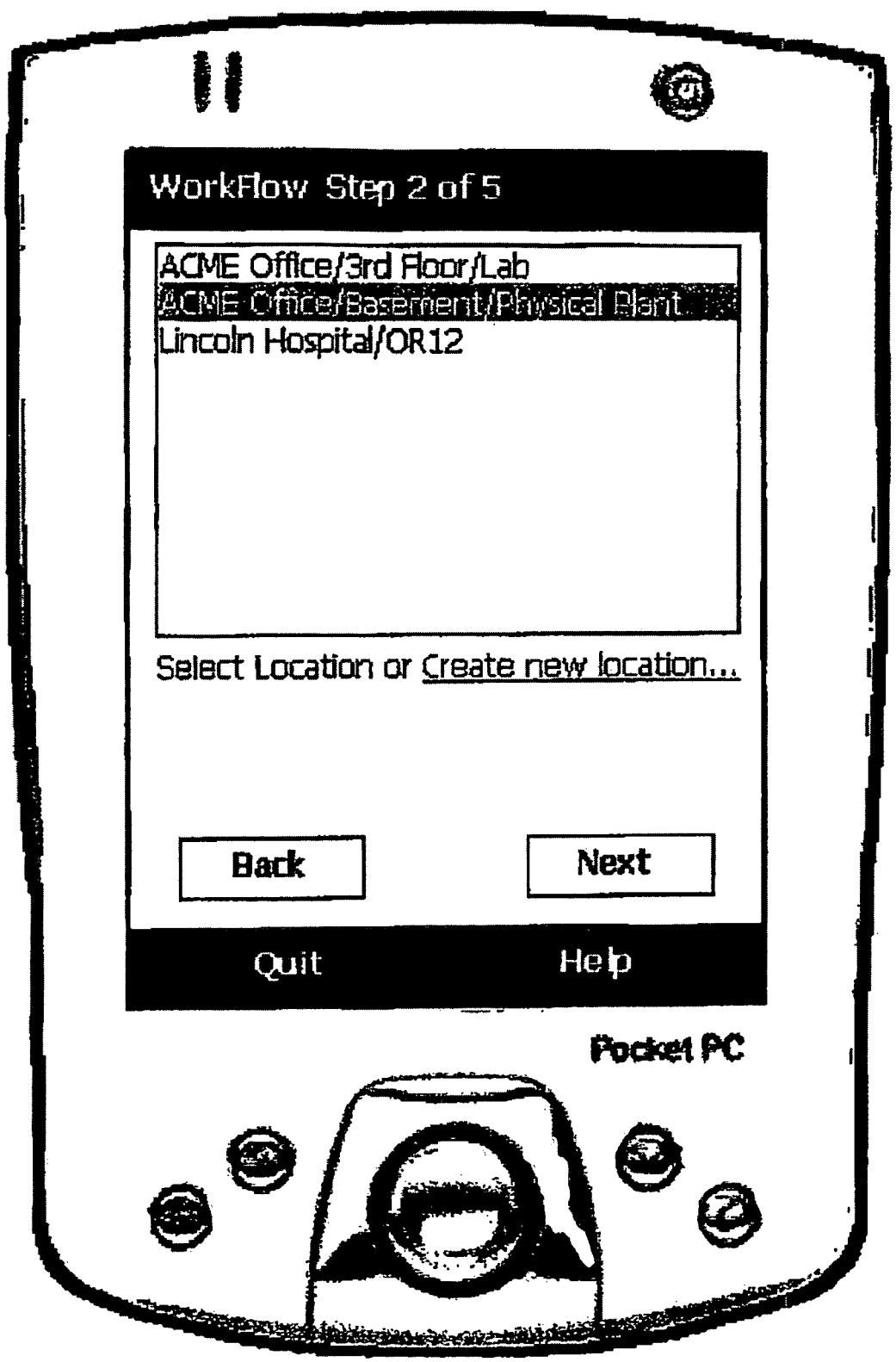
FIG. 7 illustrates an example of a screen shot showing the selection of a location.
Figure 8:
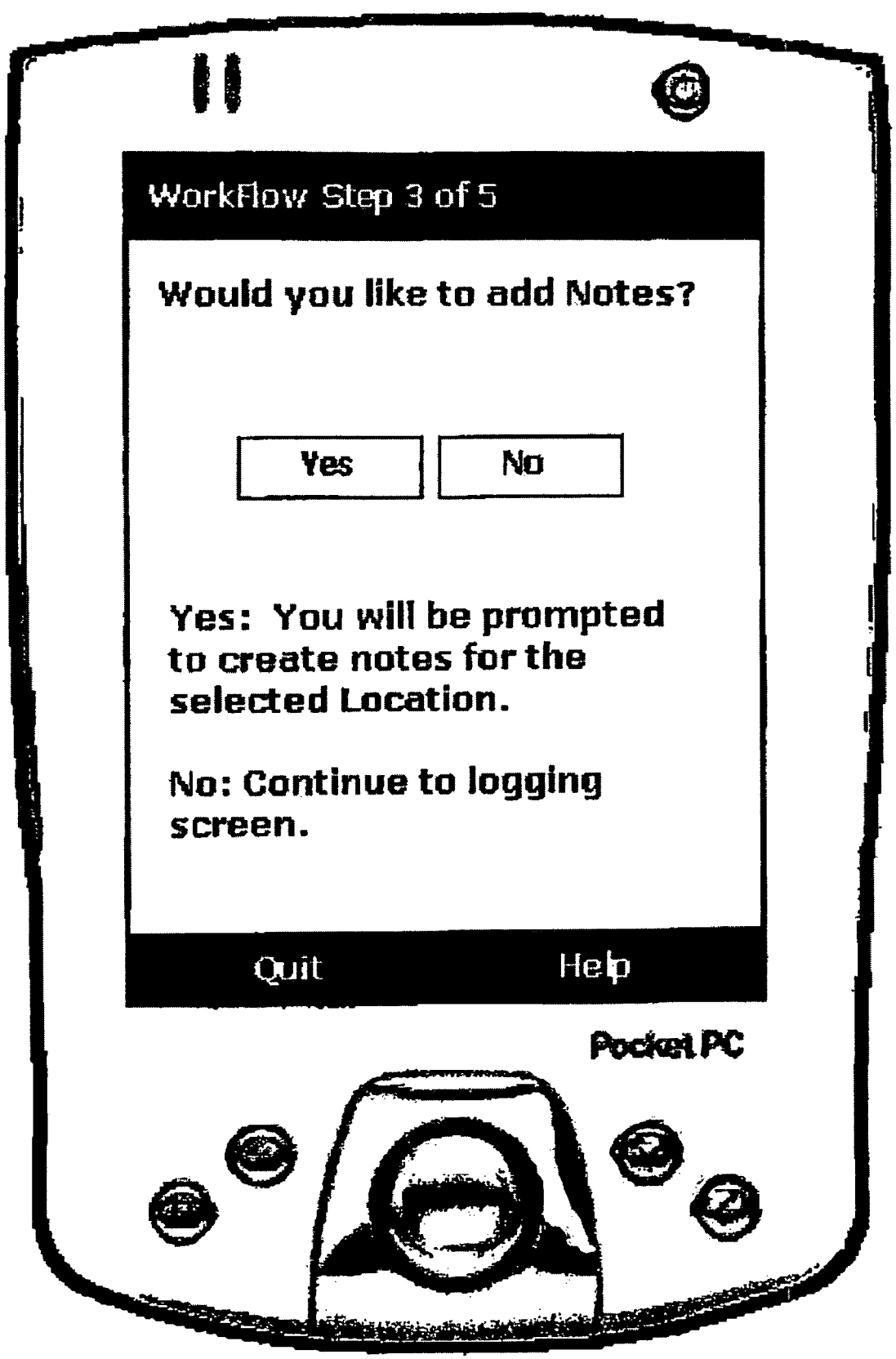
FIG. 8 illustrates an example of a screen shot prompting a user to add notes.

The screens of FIGS. 6-8 are accessed in sequence by repetitively clicking on the "Next" link on the sequential screens. The SELECT LOCATION action prompts the user to select a location to start for where their data is being logged for. An example of the screen for the SELECT LOCATION ACTION is shown in FIG. 7. The user may select a location or has the option to create a new location.

The ADD NOTE action prompts the user to attach notes to their logged data files. The ADD NOTE action will attach a note file to a logged data file. An example screen showing the ADD NOTE action is shown in FIG. 8. The ADD NOTE screen may be accessed by answering YES to the prompt as shown in FIG. 8

There are a wide range of types of notes that may be selected and added. The types of notes may be selected from text, drawing, template, audio, photo, event, or custom note. Notes may be selected by type in field 27 and content in field 29, by clicking button 31, optionally after clicking button 33 and editing same on the keyboard of device 35.

Figure 9:
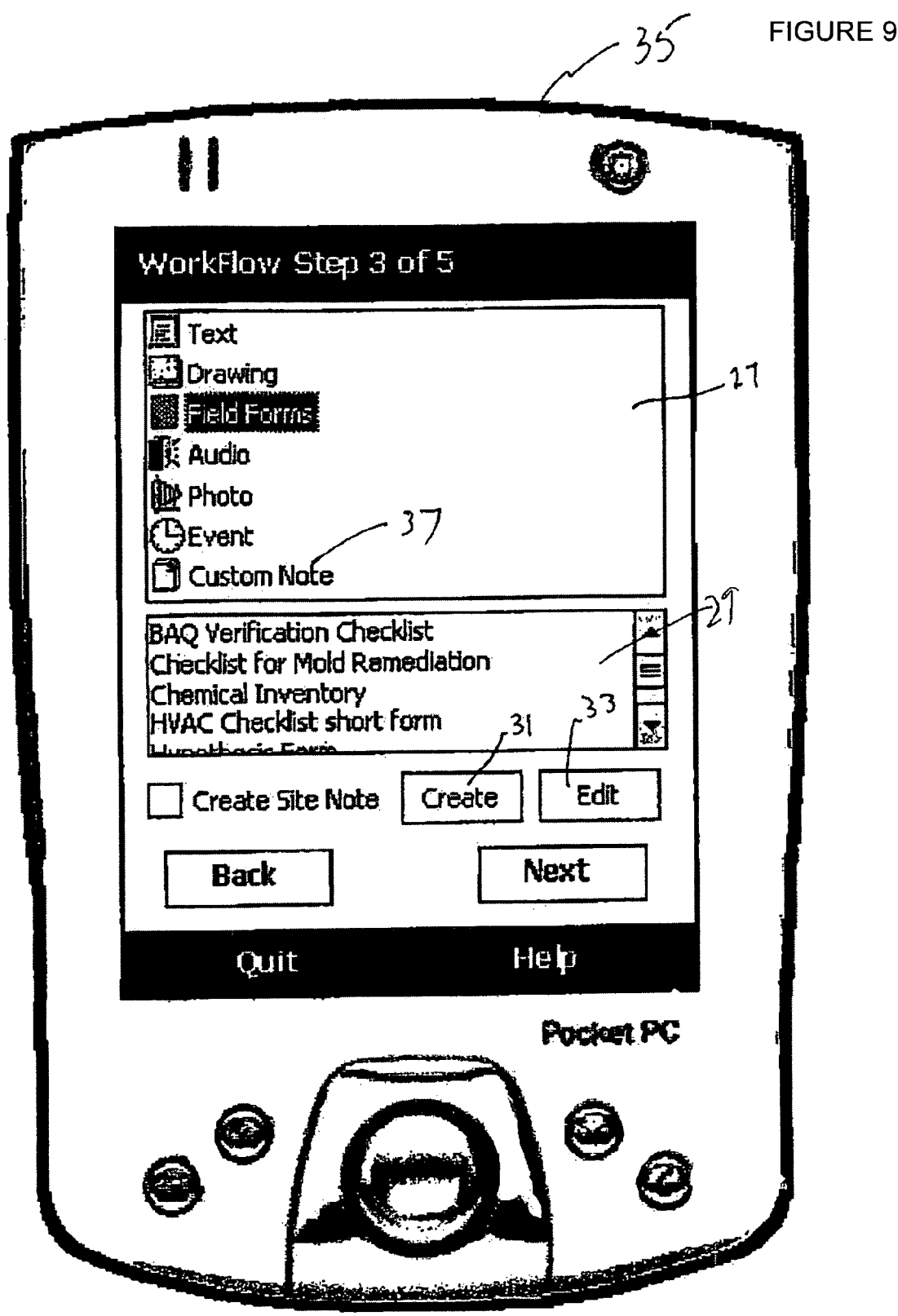
FIG. 9 illustrates an example of a screen shot showing the selection of different types of notes that a user may select.

A sample screen for selecting the type of notes is shown in FIG. 9. The NO-OP action does nothing and allows the user to fall to the next action. The NO-OP action would be used when the user, for example, is prompted to take notes with the NOTE action and the user selects no. In this case, the program will move to the next sequence by the NO-OP action. The STATS action prompts the user to begin taking minimum, maximum, and/or average readings. The STATS action allows a user to be constantly running and updating statistics. Alternatively, user could set the begin and end times to take the statistics.

Figure 10:
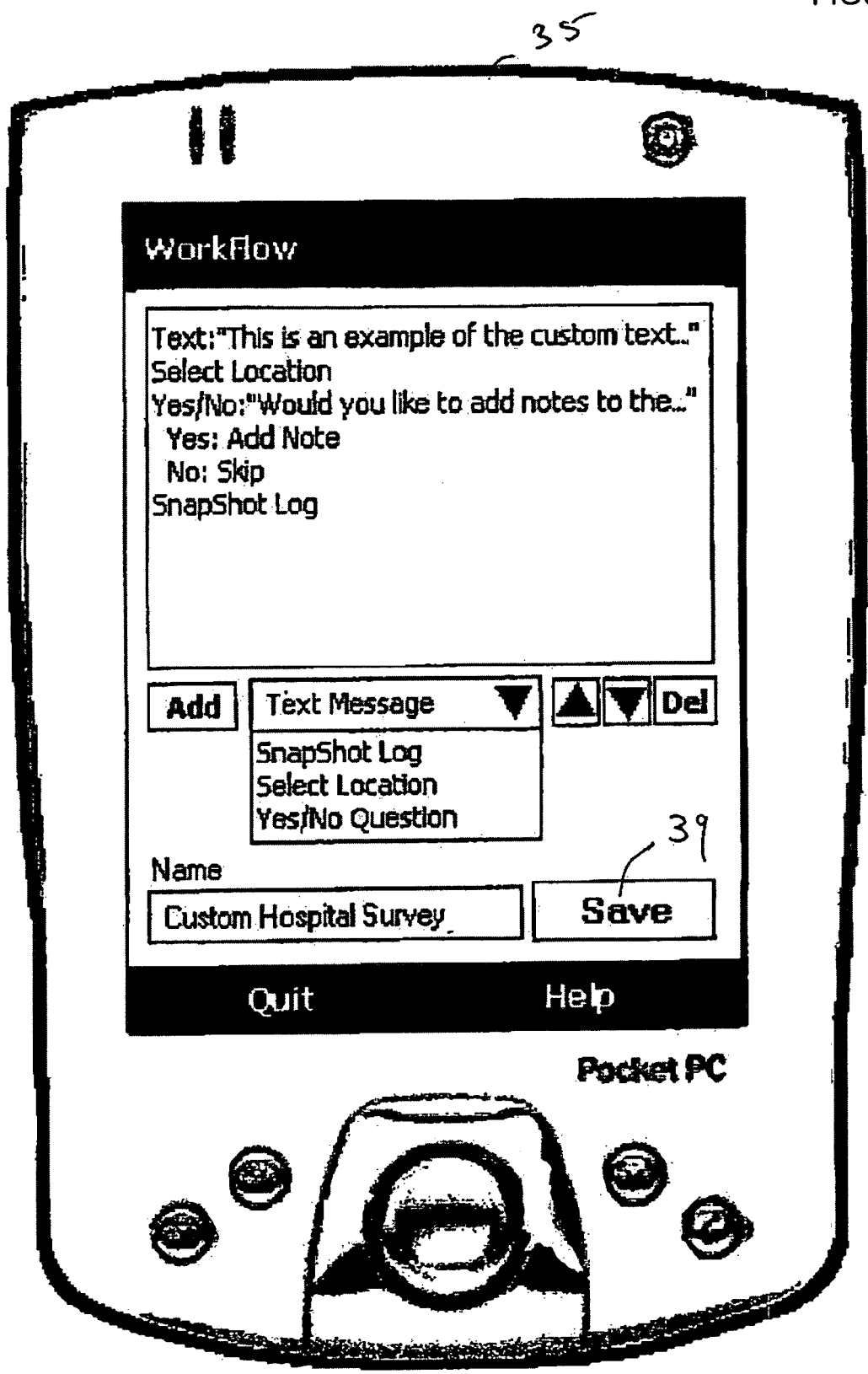
FIG. 10 illustrates an example of a screen shot showing the customization interface in accordance with an embodiment of the present invention.

Optionally, a custom note may be entered by clicking on the "custom note" link 37 in the screen of FIG. 9, which brings up the screen of FIG. 10, where a custom note may be entered using the keyboard of device 35 and saved by clicking save tab 39.

Each action has additional parameters. The additional parameters include Help Text, Prompt Text, Sub Actions (YES/NO). The Help text is an additional parameter that a user may activate. The help text allows the user to see a text box with helpful information for the program and to get help with a specific parameter. A user may access the Help Text by tapping on a small icon. This icon is optional and a user may select the icon to be shown on the screen.

FIGS. 6-10 show one workflow. Alternate workflow sequences may be programmed by the operator of the system to guide user-employees through desired measurement processes, by selection of a workflow at the screen of FIG. 11. They may be customized in terms of any desired parameter to specific tasks, including number of measurements, reading types and other instrumentation setting, number of points of measurement per room/space and location of same and so forth. The user creates or edits a custom workflow program with the workflow customization interface at step 24. The user has the option to create a custom workflow or edit a default previously installed workflow program and save the modifications with a custom name. The user creates a custom workflow program at step 24. When the user creates a custom workflow, the user selects actions at step 28. The user may select from actions including, but not limited to, TEXT, PROMPT, START TIMED LOG, START SNAP LOG, SELECT LOCATION, ADD NOTE, NO-OP, and STATS, in the order the user desires. A custom workflow program includes one or more of these actions. The user may change the order and edit custom workflow program until the custom workflow program is as the user desires. The additional parameters including Help Text, Prompt Text, and Sub Actions may also be defined and edited by the user. An example of workflow customization interface is shown in FIG. 10.

In the alternative, the user selects a default previously installed workflow program at step 30. The user edits, adds or deletes actions in the previously installed default workflow program at step 32. The default previously installed workflow program then becomes a custom workflow program. The user saves the name of the custom workflow program with a custom name at step 34. After saving the custom workflow program, the user may select the custom workflow program at step 36. A user also has the choice to bypass workflow customization or selection of a workflow program and may directly start the workflow wizard at step 38.

Figure 11:
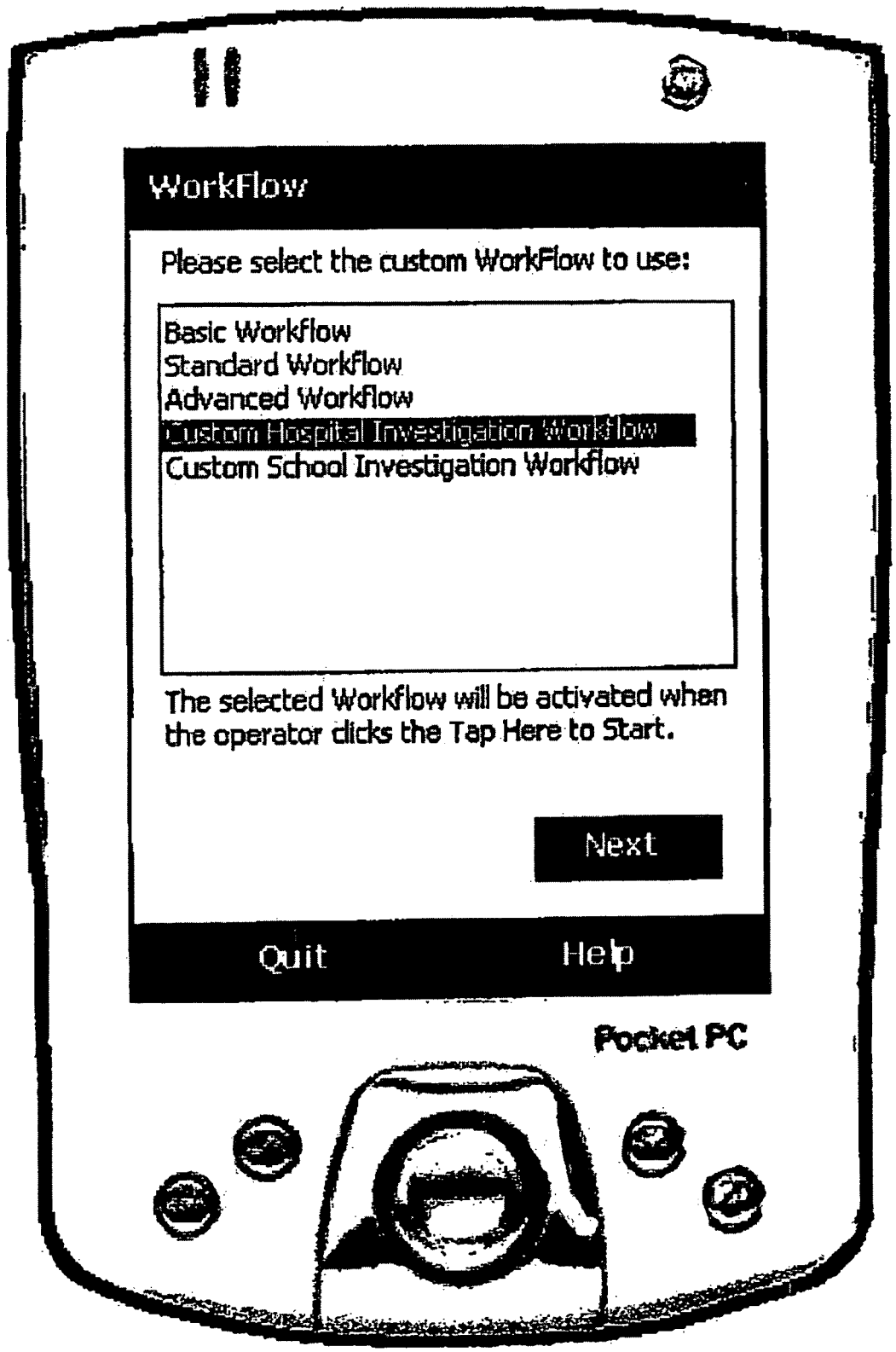
FIG. 11 illustrates an example of a screen shot showing the selection of a workflow.

At step 38, the user starts the workflow wizard by tapping on the tap to start button on the PDA screen as is shown in FIGS. 3-5. By tapping the tap to start button, the workflow wizard function is activated at step 40. The workflow wizard executes the selected program. The selected program is the program that is currently active. The currently active program may be changed by the user prior to starting the workflow wizard at step 36. An example screen showing the section of a workflow program is shown in FIG. 11. Once a user selects a program at step 36 that program will remain active and will run automatically by the workflow wizard until the user selects another program. This is why the user may bypass step 36 in the event that the program the user desires to run is already selected. Once the workflow wizard is activated by clicking on "Tap to Start", the workflow wizard will step the user through the selected program and run each action at step 42, as described above in connection with FIG. 6 to 10.

Optionally, a user may select and manipulate many different workflow programs through the workflow customization according to the present invention. These workflow programs, whether the programs are default programs or customized programs, are stored, for example, as XML in the following basic schema:

```
<program name ="Test Program 1">
    <action stepid="1" verb="TEXT" text="The text you wish to display to the
user." helptext="Any help text the user wanted to add would be contained
here."></action>
    <action stepid="2" verb="SELECTLOCATION" text="Select Location"
helptext="This is where help goes">
    </action>
    <action stepid="3" verb="PROMPT" text="Would you like to start a Log?"
helptext="Help Text for step">
        <prompt id="YES">
        <action stepid="3.1" verb="STARTLOG" text="Start Log" helptext="This is
where help goes">
        </action>
        </prompt>
        <prompt id="NO">
        <action stepid="3.2" verb="NOOP" text="SkipStep" helptext="This is
where help goes">
        </action>
        </prompt>
    </action>
</program>
```

An illustrative embodiment of the inventive method 50 is illustrated in FIG. 12. At step 52, the user selects a program from a default previously installed program or a custom program. The user presses the tap to start button which activates the workflow wizard at step 54. When the program runs the SELECT LOCATION action, the workflow wizard prompts the user to select a location at step 56 A text box appears that reads "place probe in middle of room" at step 48 which allows the PDA in combination with a sensor to log data in accordance with the inventive method. In this illustrative embodiment, the next action is ADD NOTES at step 60, so the user will be asked "Do you want to add notes?" and then YES/NO options appear. If the user selects YES at step 62, the user is prompted to add notes at step 64. If the user selects NO at step 66, the program will move to the next action by way of a NO-OP action. In method 50, the next action is START SNAP LOG at step 68. At step 68, a snapshot log is taken. At the end of the program, when all actions have run, method 50 ends at step 70. The workflow wizard then closes.

It is contemplated that the method according to the present disclosure may be used in a variety of different spaces that environmental monitoring would be of use. Typically, the method according to the present disclosure would be useful in any location or space where it is desirable to maintain certain environmental conditions. Some examples include hospitals, restaurants, grocery stores or other retail space, office buildings, science labs, museums, etc.

While an illustrative embodiment of the invention has been described, it is understood that various modifications may be made by those of ordinary skill in the art. Such modifications are within the spirit and scope of the invention which is limited and defined only by the appended claims.

What is claimed is:

1. A method for collecting quantitative environmental data relating to an indoor space inside a building, using a data logging and analysis program, the method comprising:

connecting a computer to a data collecting means;

accessing a workflow interface that allows a user to select a data collection program having at least one action;

accessing a user interface to run the data collection program; and editing a default program including said at least one action, wherein said data collecting means is a sensor for collecting environmental data.

2. Wherein the workflow interface allows a user to customize a data collection program by selecting at least two actions and selecting the order of said actions.

3. A method for collecting data using logging and analysis program as in claim 1, wherein said at least one action is selected from TEXT, PROMPT, START TIMED LOG, START SNAP LOG, SELECT LOCATION, ADD NOTE, NO-OP, and STATS.

4. A method for collecting data using a data logging and analysis program as in claim 1, wherein said computer is a mobile computer or laptop computer.

5. A method for collecting data using a data logging and analysis program as in claim 1, wherein said computer is connected to said data collecting means by a probe connection.

6. A method for collecting data using a data logging and analysis program as in claim 1, wherein said computer is connected to said data collecting means by a wireless connection.

7. A method for collecting data using a data logging and analysis program as in claim 1, further comprising saving a customized program based on a users particular application.

8. A method for collecting data on environmental conditions in a room inside a building, whose temperature and air quality may be controlled by mechanical systems, using a data logging and analysis program, said system comprising:

an interface, said interface allowing entry of a plurality of actions in an order determined by a user;

an editing means allowing the user to change the order of said plurality of actions; and a display where the user views and analyzes data, wherein said system is a handheld device connected to a sensing means, wherein said sensing means is an environmental sensor that detects environmental parameters.

9. A method for collecting data using a data logging and analysis program as in claim 8, wherein said plurality of actions are selected from TEXT, PROMPT, START TIMED LOG, START SNAP LOG, SELECT LOCATION, ADD NOTE, NO-OP, and STATS.

10. A method of determining environmental conditions in a space inside a building, comprising:
   (a) programming a portable, handheld device with a program which presents a series of instructional screens to a user, at least some of said screens being adapted for receiving user input information and outputting guidance information in the form of user prompts to said users, at least one of said screens being adapted to receive an input from the user to cause the storage of environmental data;
   (b) connecting an environmental sensor that detects environmental parameters to said portable, handheld device;
   (c) cycling through said program in response to said user prompts; and
   (d) storing environmental measurement information output by said environmental sensor.

11. A method of determining environmental conditions in a building, comprising:
   (a) programming a portable, handheld device with a program which presents a series of instructional screens to a user, at least some of said screens being adapted for receiving user input information and outputting guidance information in the form of user prompts to said users, at least one of said screens being adapted to receive an input from the user to cause the storage of environmental data;
   (b) connecting an environmental sensor that detects environmental parameters to said portable, handheld device;
   (c) cycling through said program in response to said user prompts; and
   (d) storing environmental measurement information output by said environmental sensor.

12. A method of determining environmental conditions in a building as in claim 11, wherein said series of screens include screens which allow the attachment of notes to environmental measurement information.

13. A method of determining environmental conditions in a building as in claim 11, wherein said series of screens may be selected from a plurality of location specific screens associated with a particular space.

14. A method of determining environmental conditions in a building as in claim 11, wherein said series of screens are selected from a plurality of selections for locations of various types, such as hospitals, commercial space and so forth.

* * * * *